Figure 2:
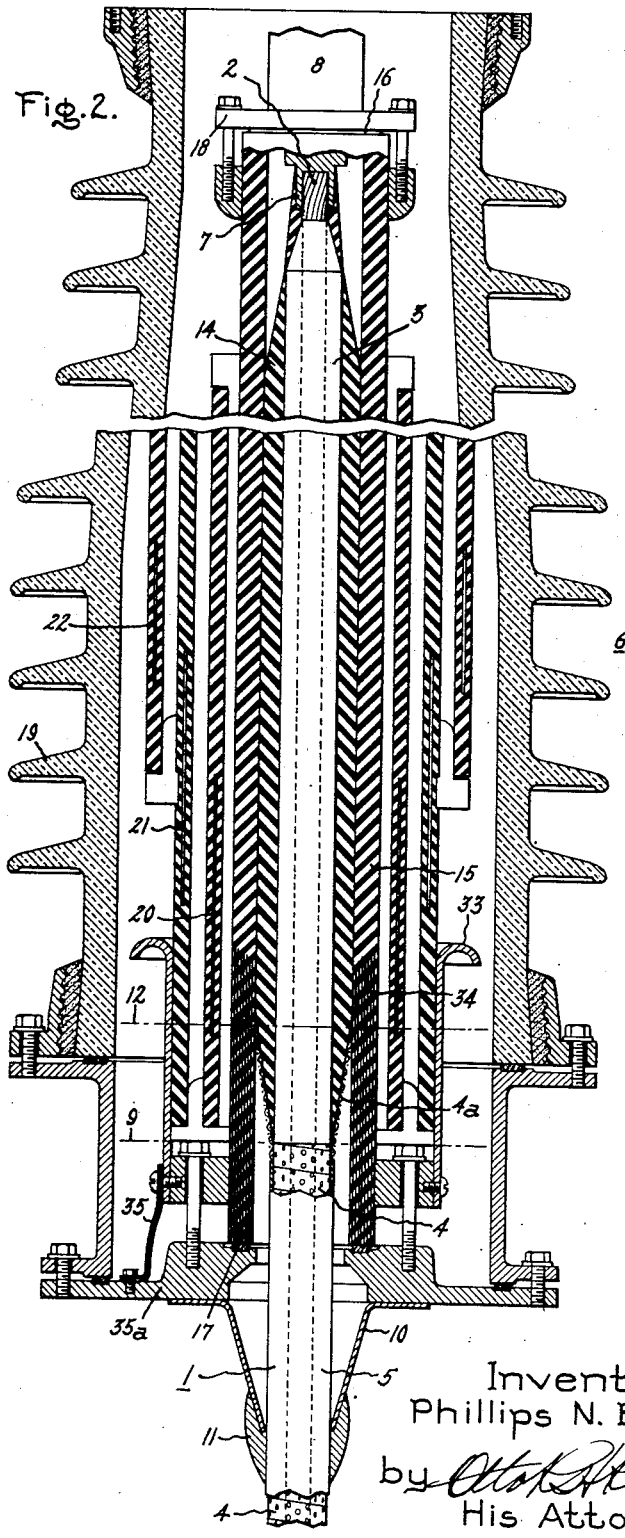

Sept. 8, 1953 P. N. BOSWORTH 2,651,670
HIGH-VOLTAGE POTHEAD WITH STRESS DISTRIBUTING MEANS
Filed April 13, 1951 2 Sheets-Sheet 1
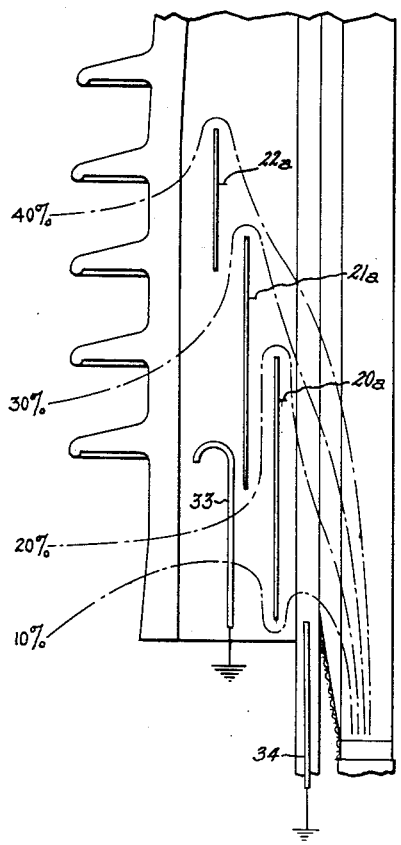
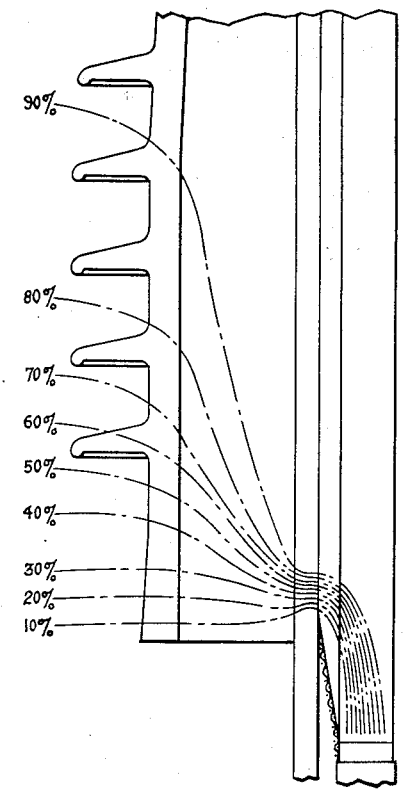
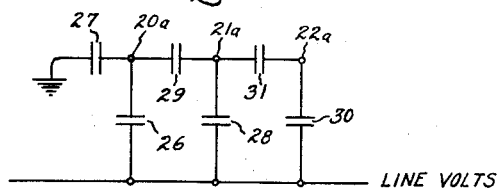
Inventor:
Phillips N. Bosworth,
by
His Attorney.

Sept. 8, 1953 P. N. BOSWORTH 2,651,670
HIGH-VOLTAGE POTHEAD WITH STRESS DISTRIBUTING MEANS
Filed April 13, 1951 2 Sheets-Sheet 2

Inventor:
Phillips N. Bosworth,
by
His Attorney.

Patented Sept. 8, 1953

2,651,670

UNITED STATES PATENT OFFICE 2,651,670

HIGH-VOLTAGE POTHEAD WITH STRESS DISTRIBUTING MEANS

Phillips N. Bosworth, Becket, Mass., assignor to General Electric Company, a corporation of New York Application April 13, 1951, Serial No. 220,844

1 Claim. (Cl. 174—73)

This invention relates to cable termination and, in particular, to the termination of the high-voltage cable at a pothead.

For the purpose of this application, a pothead is an insulated device or bushing usually having an outer insulating container of porcelain; the pothead being employed both to provide a mechanical seal for a high-voltage fluid-filled cable and to provide a terminal for the electrical connection of the cable to other electrical apparatus.

High-voltage cable commonly comprises a conductor, insulated and wrapped overall with a grounding tape, the assembly in turn being fitted into a lead sheath. The cable is then filled with fluid under pressure through processes that are well known in the art and installed in a metal conduit for underground protection. In some embodiments the conduit is in turn filled with a fluid under pressure.

Basically, the construction of the pothead is such that a portion of a grounding tape and insulation is stripped away from the cable at the top of a pothead to expose a bare portion of the conductor. The bare portion of the conductor is gripped at the upper end of the pothead by a sleeve which is connected to a terminal available for connection to a power source, or load.

This invention relates to the electrical condition that exists within the pothead and between the terminal or sleeve and the termination of the grounding tape where electric stresses exerted by the high-voltage on the conductor must be controlled to prevent dielectric breakdown in the insulation. That is, when a grounding tape surrounds an insulated conductor and when an electric potential is applied between them, substantially radial electric stresses result in the dielectric. As soon as the grounding tape and lead sheath of the cable are terminated, however, the radial electric stress is also terminated and the electric stress instead takes on both axial and radial components. The component of this electric stress in the axial direction must be carefully controlled since the dielectric strength of the insulation is weakest in this direction. This is because the insulation usually comprises a plurality of windings of thin insulating material to produce concentric, axially extending gaps which offer lower resistance to electric stresses than if offered by a line radially through the insulation from the conductor to the grounding tape.

An example of the problem encountered in this field is indicated in Fig. 1 of the drawing wherein various equipotential lines are shown concentrated near the termination plane of the grounding tape. It is to be noted that these equipotential lines are made from an actual electric field plot and give a true picture of what happens to the voltage distribution as it leaves a conductor of a high-voltage cable. The various curves in the schematic diagram of Fig. 1 are equipotential lines marked from the 10 per cent, 20 per cent, etc. of the total voltage existing between conductor and grounding tape to show the electric field pattern on a plane through the conductor and coincident with the axis of the conductor. The effect of this distribution is to produce a concentration of voltage stress in the dielectric that may easily become high enough to cause this dielectric to breakdown or become conducting. The plot of the equipotential lines relative to the plane of termination of the grounding tape gives a graphic example of the dielectric problems produced in the cable insulation. For example, insulation might withstand 25,000 volts per inch radially, but only about 10,000 volts per inch axially. Then if a 50 per cent line of a plot of voltage distribution of a 138 kv. cable crossed the insulation less than three inches from the plane of termination of the grounding tape, the insulation would be liable to breakdown since 40 kv. would be insulated by only 30 kv. of insulation.

It is an object of this invention to provide a new and improved high-voltage pothead wherein the equipotential lines are somewhat uniformly distributed in an axial direction to prevent the possibility of axial dielectric breakdown.

It is a further object of this invention to provide a new and improved high-voltage pothead wherein the axially directed electric stress is uniformly distributed and a suitable seal is offered within the pothead to the fluid pressure surrounding the cable.

Further objects and advantages of this invention will become apparent and the invention will be more clearly understood from the following description, referring to the accompanying drawing, and the features of novelty which characterize this invention will be pointed out with particularity in the claims annexed to and forming a part of this specification.

Briefly, this invention relates to a new and improved high-voltage pothead wherein a plurality of insulating cylinders, positioned within a pothead, are formed with a conducting layer or layers therein which produce a capacitance effect between a conductor and the grounding tape of the cable. The combination of these capacitance effects produces a uniform distribution of the voltage lines of Fig. 1 of the electric field emanating from the cable to alleviate the possibility of breakdown of the dielectric due to the close axial position of the voltage lines.

As mentioned before, Fig. 1 is a plot of equipotential lines of the electric field emanating from a cable in the high-voltage pothead; Fig. 2 is a sectional view of the new and improved high-voltage pothead, Fig. 3 is a plot of equipotential lines of the field emanating from a high-voltage pothead after it has been improved with the elements of my invention, and Fig. 4 is a schematic illustration of the capacitance network of my invention.

In the drawing, cable 1 is shown comprising a conductor 2 which may be made up of a plurality of spirally-wound strands of wire, paper insulation 3, a metallic grounding tape 4, and a lead sheath 5. The cable is shown brought into a pothead 6 at one end and connected by a sleeve 7 to a terminal 8 at the other end of the pothead.

The grounding tape and lead sheath in this embodiment is stripped back from the bare cable 2 at the top of the pothead to a plane 9, the location of which is determined by the voltage rating of the pothead. To provide a pressure-tight seal, a metal shield 10 (a component of pothead 6) is connected to the outer lead sheath 5 by means of a plumber's wipe joint 11.

As has heretofore been mentioned, a pressure is maintained within the cable 2 and it is intended that this pressure not be lost in the pothead. To achieve this end, a pressure tube 15 having a small diameter and a wall thickness commensurate with pressure is positioned about the insulated cable and is sealed at each end of the pothead 6 by gaskets 16 and 17 respectively. This pressure tube 15 is made of a resin impregnated laminated material having a high tensile strength that is great enough to withstand the internal pressures within the cable and which, at the same time, has a high dielectric value. It is to be noted that the gasket 16 is placed between the pressure tube 15 and a plate 18, which surrounds the electrical connection between sleeve 7 and the terminal 8.

A petticoat type porcelain jacket 19 is then positioned over the pressure tube 15 to protect the internal elements from the weather and to provide a good insulating barrier between the cable and ground. Of further note is that low pressure oil, say in the order of 10 p. s. i., is contained in the space between the pressure tube 15 and porcelain jacket 19. The oil increases the insulation value of the pothead.

At the termination plane 9 of the grounding tape a stress cone is built according to usual practice for terminating high voltage cable by means of wrappings of insulation 14 to a diameter providing only assembly clearance within the pressure tube 15. The tapered lower end of this stress cone 14 is covered with conducting braid 4a, which in turn is electrically connected to the cable grounding tape at 9. If the outer braid 4a were terminated at plane 12 abruptly, the electric stress lines would circle right back around the edge of the braid to effect a distribution of electric stress lines such as that shown in Fig. 1 of the drawing which would result in a high probability of dielectric breakdown along the layer of insulation 14 adjacent the grounding shield termination point 12.

It is to avoid this condition that a plurality of stepped radially spaced conducting sleeves, or cylinders, are placed around the pressure tube 15. The sleeves 20, 21, and 22 can be supported in any conventional manner, but one method of supporting them is to form another resin impregnated laminated cylinder and, at a predetermined position, wrap a layer of the conducting material between the insulating layers of the cylinder.

These cylinders 20, 21, and 22 are then electro-statically coupled to ground through a pair of grounded cylinders 33, 34 positioned at the base of the pothead adjacent the sleeve 20.

In one embodiment cylinder 34 is made integral with the lower end of the pressure cylinder 15 by painting the paper forming cylinder 15 with an electrical conducting coating.

It is to be noted that cylinder 33 is maintained at ground potential as indicated by the grounding strap 35, while cylinder 34 is grounded by means of its clamping and supporting structure 35a.

While in this embodiment I have shown three conducting cylinders 20, 21, and 22 and two grounded cylinders 33, 34, it is to be realized that the number of cylinders is dependent upon the voltage rating of the pothead and the number shown is not to be considered a limitation on the scope of this invention. The particular cylinder arrangement shown, for example, has been successfully used with 138 kv. cable.

The cylinders 20, 21, and 22 and grounded cylinders 33 and 34 provide a capacitance effect which deflects the equipotential lines of the field emanating from the cable causing them to move axially to be distributed substantially equally along the insulation 14 extending above the plane 12. The result that is achieved thereby is indicated in Fig. 3.

While the use of the conducting cylinders 20, 21, and 22 will spread the equipotential lines emanating from the cable 1, it is more important to know the means and manner of selecting the position and size of the cylinders. The cylinder dimensions are determined either by experiment or by mathematical computation based on Fig. 4 of the drawing. Specifically, a reasonable diameter of the cylinders 20, 21, and 22 and 33 and 34 is determined by the physical limitations within the pothead and from radial voltage stress limitation on the insulation between the cylinders. Having selected these diameters, it is then of importance to be able to locate the cylinders in the proper axial position within the pothead and then compute the area and hence the capacitance of the cylinders. To establish the axial position, desired voltage values are first assigned to the cylinders, for example 12½ per cent, 25 per cent, and 37½ per cent of voltage between conductor and ground. The center of the portion of each cylinder directly overlying the conductor (i. e. the points 20a, 21a, and 22a respectively) is then located so that the equipotential line having the same value as its assigned voltage will meet the cylinder at this point.

Having located the cylinders axially and with the diameters established as described, it is then of importance to be able to establish by computation the proper area of the cylinders and the associated capacitances between the cylinders and between the cylinders and the cable conductor so that the capacitance values assure the voltage values already assigned to the cylinders.

Careful analysis of the capacities involved will reveal that they can be represented by a network such as shown in Fig. 4 of the drawing wherein capacity 26 represents the capacitance between the conductor 2 and cylinder 20 of the drawing; capacity 27 represents the capacitance betwen cylinder 20 and the grounded cylinders 33, 34, etc. It will readily be seen that all of these capacities are calculable since they are dependent on known areas, voltages and distances and that the capacities between cylinders can be adjusted by varying their coupling or overlapping length.

When the cylinders 20, 21, and 22 and grounded cylinders 33, 34 are formed and positioned in accordance with the calculation mentioned above, they assume the desired voltages because of their respective capacities. This improved structure then produces the axial distribution of equipotential lines shown in Fig. 3. This distribution exists according to the fundamental electrical theory and has been proven to exist by electrolytic field plots on models and by electrical tests on full scale assemblies.

Modifications of this invention will occur to those skilled in the art and it is desired to be understood, therefore, that this invention is not intended to be limited to the particular embodiment disclosed, but rather is intended to cover all modifications which are within the true spirit and scope of this invention.

What I claim as new and desire to secure by Letters Patent of the United States is:

In a pothead used for terminating high voltage cable, means for effecting uniform distribution of equipotential lines to prevent axially directed dielectric breakdown, said distributing means comprising a plurality of insulating cylinders and a plurality of stepped radially spaced electrically conducting cylinders concentrically located with respect to one another and to a central unshielded electric conductor, means for insulating said conducting cylinders from one another and from ground and from said conductor, said insulating means comprising the forming of said conducting cylinders in an insulating cylinder by wrapping a layer of electrically conducting material between the layers of a resin impregnated paper during the formation of said insulating cylinder, means for spacing said insulating cylinders whereby each of said electrically conducting cylinders has a portion overlying a complementary portion of one other of said electrically conducting cylinders, and each has a portion directly overlying said electric conductor, an electrically conducting cylinder held at ground potential located concentric with said cable and between a portion of the radially inner one of said ungrounded cylinders and said conductor with successive of said conducting cylinders being radially spaced to overlie both a portion of the next radially inner one thereof and a portion of the conductor whereby all of said cylinders interact to form a capacitance network to effect an approximately uniform distribution of the electric field.

PHILLIPS N. BOSWORTH.

References Cited in the file of this patent

UNITED STATES PATENTS

| Number | Name | Date |
| --- | --- | --- |
| 1,563,946 | Atkinson | Dec. 1, 1925 |
| 1,935,820 | Scott et al. | Nov. 21, 1933 |
| 1,950,608 | Hanson | Mar. 13, 1934 |
| 2,016,004 | Gay | Oct. 1, 1935 |
| 2,374,638 | Lee | Apr. 24, 1945 |
| 2,386,185 | Beaver et al. | Oct. 9, 1945 |